United States Patent [19]
Derolf et al.

[11] Patent Number: 5,998,329
[45] Date of Patent: Dec. 7, 1999

[54] METHOD FOR MAKING SPHERICAL ADSORBENT PARTICLES

[75] Inventors: Mahlon Robert Derolf, Pottstown; Leonard Harris Smiley, Rydal; Reinhard Herbert Witt, Wyncote, all of Pa.

[73] Assignee: Bio-Technical Resources, Manitowoc, Wis.

[21] Appl. No.: 08/885,340

[22] Filed: Jun. 30, 1997

Related U.S. Application Data

[63] Continuation-in-part of application No. 08/448,165, May 23, 1995, abandoned, which is a continuation-in-part of application No. 08/262,115, Jun. 17, 1994, abandoned.

[51] Int. Cl.⁶ .............................. B01J 20/10; B01J 35/08
[52] U.S. Cl. .......................... 502/407; 502/8; 502/9; 502/406; 502/414; 501/12
[58] Field of Search .................. 502/8, 9, 406, 502/407, 414; 501/12

[56] References Cited

U.S. PATENT DOCUMENTS

| | | | |
|---|---|---|---|
| 4,010,242 | 3/1977 | Iler et al. | 423/335 |
| 4,127,641 | 11/1978 | Aldcroft et al. | 423/339 |
| 4,131,542 | 12/1978 | Bergna et al. | 210/31 C |
| 4,392,987 | 7/1983 | Laine et al. | 252/448 |
| 4,600,646 | 7/1986 | Stout | 428/405 |
| 4,746,572 | 5/1988 | Glajch et al. | 428/403 |
| 4,847,159 | 7/1989 | Glajch et al. | 428/447 |
| 4,847,518 | 7/1989 | Kirkland et al. | 210/502.1 |
| 4,902,413 | 2/1990 | Stout et al. | 210/198.2 |
| 4,986,908 | 1/1991 | Stout et al. | 210/198.2 |
| 5,032,266 | 7/1991 | Kirkland et al. | 210/198.2 |
| 5,079,155 | 1/1992 | Cox et al. | 435/181 |
| 5,128,114 | 7/1992 | Schwartz | 423/335 |

FOREIGN PATENT DOCUMENTS

61-174103   8/1986   Japan .

*Primary Examiner*—Glenn A. Caldarola
*Assistant Examiner*—In Suk Bullock

[57] ABSTRACT

The invention is directed to an unsintered spherical adsorbent particle composition having high mechanical strength and controlled pore size distribution, comprising finely divided silica hydrogel particles bonded together with a silica or metal oxide sol.

10 Claims, 5 Drawing Sheets

METHOD FOR MAKING SPHERICAL ADSORBENT PARTICLES

CROSS-REFERENCE TO RELATED APPLICATION

This application is a continuation-in-part of U.S. patent application Ser. No. 08/448,165, filed May 23, 1995, now abandoned, which is a continuation-in-part of U.S. patent application Ser. No. 08/262,115, filed Jun. 17, 1994 and now abandoned.

FIELD OF INVENTION

The invention is directed to novel silica gel microsphere compositions and to an economical method for making them.

BACKGROUND OF THE INVENTION

Metal oxide adsorbents, particularly silica-based adsorbents, are widely used in both domestic and industrial applications. For example, they are used in process and analytical chromatography to conduct very difficult separations and to produce products having very high levels of purity. Such materials are also used in food processing, for example, to decolorize and purify sugars. They are also frequently used as catalysts supports. Most of these applications involve separations and in all cases the relevant adsorbent characteristic, such as pore size, pore volume, surface area, etc., are very important.

Such materials have been made by spray drying silica sols, followed by sintering of the particles to adjust the pore volume. For example, U.S. Pat. No. 4,131,542 to Bergna et al. discloses a method for making low cost silica packing by spray drying an aqueous silica sol to form porous micrograms, acid washing the micrograms and then sintering the acid-washed grains to reduce surface area by 5–20%.

U.S. Pat. No. 5,128,114 to Schwartz discloses making high-strength uniform porous silica microspheres by spray drying a mixture of silica hydrosol and ammonium nitrate or urea and then sintering the particles without fusing the microspheres into agglomerates.

The foregoing prior art methods have in common that particle sphericity can be obtained by spray drying and that sintering is required to adjust parameters such as pore volume and pore size.

In addition, Japanese Kokai 61-174103 discloses a method for making porous spherical fine powders by mixing a colloidal solution of inorganic oxides and an inorganic oxide hydrogel or xerogel to form a slurry and spray drying the slurry in a stream of hot gas. Upon sintering the spray dried particles at 600° C. for 3 hours, particles in the range of 1–20 micrometers having a pore volume of 0.1–0.8 cc/g are produced. While the use of hydrogels is disclosed, only the use of xerogels is exemplified.

U.S. Pat. No. 4,010,242 to Iler et al. involves making uniform porous silica microspheres by coacervating a solution of silica hydrosol and urea-formaldehyde or melamine-formaldehyde polymer under polymerizing conditions to form microspheres, oxidizing the microspheres to burn off the polymer and then sintering the oxidized microspheres to reduce surface area.

U.S. Pat. No. 4,902,413 to Stout et al. discloses making uniform porous silica microspheres by coacervating a solution of silica hydrosol and urea-formaldehyde or melamine-formaldehyde polymer under polymerizing conditions to form microspheres and removing the polymer by solvent extraction, after which the particles are dried without sintering.

While the prior art methods of producing spherical particles of this type are effective in particular respects, many require extraction of organic adjuvants. Moreover, it is difficult to adjust the process parameters of these prior processes in such fashion that critical properties such as pore volume, sphericity, microporosity, etc., can be controlled reliably.

SUMMARY OF THE INVENTION

The invention is therefore directed generally to an economical method for controllably producing spherical adsorbent particles in which the critical physical properties of the particles can be controlled by adjustment of the operating variables optionally without the necessity of sintering the particles.

In its first aspect, the invention is directed to such a method for making unsintered spherical adsorbent particles having high mechanical strength and controlled pore size distribution comprising the steps:

(1) forming a dilute aqueous admixture of (a) 50–99.5% wt. particles of silica hydrogel, the particles having a mean diameter of 0.01–1 micrometer and (b) 50–0.5% wt. stabilized sol selected from silica sol, sol of a metal oxide in which the metal is selected from Al, Fe, Mg, Sb, Sn, Ti, Zn, Zr and mixtures of such sols in which the silica and metal oxide content is 1–30% wt., and the average particle size of the sol particles is 2–100 mm; and (2) forming droplets from the dilute sol/hydrogel admixture and reducing the water content of the droplets to form therefrom agglomerated solid particles of spherical configuration by passing the droplets through a humid gas drying chamber in which the inlet temperature of the sol/hydrogel droplets is 65–100° C. (150–210° F.) and the outlet temperature of the resulting solid particles is 150–200° C. (300–400° F.); and (3) heat treating the solid particles from step (2) by contacting them with a gas or vapor having a water content of at least 20% wt. And temperature of at least 125° C., but below the sintering temperature of the oxides therein to form particles having an average size of 3–150 micrometers.

(4) cooling the treated particles from step (3); and (5) treating the cooled particles from step (4) with an aqueous solution of inorganic acid to stabilize the surface of the particles to a pH of about 7.

In its second aspect, the invention is directed to a method for making agglomerated adsorbent particles having a high mechanical strength and controlled pore size distribution comprising the steps:

(1) forming a dilute aqueous admixture of (a) 50–99.5% wt. particles of silica hydrogel, the particles having a mean diameter of 0.01–1 micrometer and (b) 50–0.5% wt. stabilized sol selected from silica sol, sol of a metal oxide in which the metal is selected from Al, Fe, Mg, Sb, Sn, Ti, Zn, Zr and mixtures of such sols in which the silica and metal oxide content is 1–30% wt., and the average particle size of the sol particles is 2–100 nm; and (2) forming droplets from the dilute sol/hydrogel admixture and reducing the water content of the droplets to form therefrom agglomerated solid particles of spherical configuration by passing the droplets through a humid gas drying chamber in which the inlet temperature of the sol/hydrogel droplets is 65–100° C.

(150–210° F.) and the outlet temperature of the resulting solid particles is 150–200° C. (300–400° F.);

(3) heating the agglomerated spherical particles from step (2) to a temperature of 350–700° C. for a time sufficient to reduce the surface area and pore volume and increase the pore diameter to preselected values; and (4) cooling the heat-treated particles from step (3); and (5) treating the cooled particles from step (4) with an aqueous solution of inorganic acid to stabilize the surface of the particles to a pH below about 7.

The product from both methods is a spherical adsorbent particle composition having an average diameter of 3–150 micrometers comprising 50–99.5% wt. finely milled particles of silica hydrogel having a mean diameter of 0.01–1 micrometer bonded together with 50–0.5% wt. of a stabilized sol selected from silica sol, sol of an oxide of a metal selected from Al, Fe, Mg, Sb, Sn, Ti, Zn, and Zr and mixtures of such stabilized sols in which the silica and metal oxide content is 1–30% wt., the average size of the sol particles being 2–100 nm, the pores of the adsorbent particles being partially filled with sol particles so that none of the pores has a diameter below 10 Å, the adsorbent particles being further characterized in that the dv10/dv90 ratio is 0.9–4, surface area is 150–600 $m^2/g$, pore volume is 0.3–2 cc/g, mean pore diameter is 30–1000 Å and the water content is 0.5–15% wt.

BRIEF DESCRIPTION OF THE DRAWING

The Drawing consists of five figures.

DEFINITIONS

The term "hydrogel" refers to three dimensional networks of contiguous porous particles of silica containing 60–90% free water.

The terms "silica sol" and "metal oxide sol" refer to aqueous dispersions of discrete non-porous spherical particles of amorphous silica and metal oxide(s) respectively.

The term "dv10/dv90 ratio" refers to the ratio of the cumulative volume of the particles at the 10% and 90% points of the integrated particle size distribution curve, or the integrated pore size distribution curve.

DETAILED DESCRIPTION OF THE INVENTION

A. Hydrosol:

Any of several different types of hydrosols can be used in the method of the invention. In particular, silica sols and sols of the oxides of Al, Fe, Mg, Sb, Sn, Ti, Zn and Zr are all suitable for use in the invention. Mixtures of such sols can be used as well.

The particles in such sols are discrete, uniform, amorphous metal oxide spheres which are essentially non-porous. They are dispersed in an aqueous alkaline medium which results in a negative charge on the silica particle surfaces. As a result of the negative charge, the particles tend to repel one another and the dispersion remains stable, i.e., there is essentially no gelation or agglomeration of the particles. Such sols typically contain 3–50% by weight metal oxide solids and have a particle size of 2–100 nm. It is, however, preferred that the maximum particle size of sol solids be 10 nm or less to obtain greater bonding efficiency and to avoid clogging the pores of the spray-dried product.

Because of their commercial availability, silica sols are preferred for use in practicing the invention. Suitable colloidal silica sols are sold under the tradename LUDOX® from E. I. DuPont de Nemours & Company, Wilmington, Del.

Though the above-described hydrosols are preferred for use in the invention, it has been found that certain water soluble silicates, such as silicic acid and ammonium and alkali metal silicates, are substantially equivalent functionally to the sols in many respects.

B. Silica Hydrogel:

Commercially available silica hydrogels are quite suitable for use in the invention. Such hydrogels based on silica are prepared by mixing a liquid solution of alkaline silicate, such as sodium silicate, with an acid, such as sulfuric acid. If the acid is sufficient to neutralize the alkali, it is termed an acid-set gel. If the acid is insufficient to neutralize the alkali, it is termed an alkaline-set gel. For both acid-set and alkaline-set gels, the acid and liquid silicate mixture is maintained for a time sufficient to form a solid layer which is hard enough to be crushed to form irregularly shaped particles on the order of 0.5–1 inch maximum dimension. The resultant gel particles are then washed with water to remove salts and acid. In some instances, the washed hydrogel is hydrothermally treated with base to adjust the pore volume, surface area, and pore diameter of the gel to a level appropriate for the intended end use. Hydrothermal treatment is particularly useful to adjust the starting diameter of the hydrogel pores within the gel. Typical properties of such hydrogels when dried are as follows:

| Surface Area, $m^2/g$ | 200–600 |
|---|---|
| pH, 5% wt. in water | 4.0–6.5 |
| Pore volume, mL/g | 0.4–2.0 |
| Solids, % by weight | 25–30 |

Particularly preferred are silica hydrogels which, when dried, the surface area is 360–440 $m^2/g$ and the pore volume is 0.7–1.8 mL/g.

Even though xerogels have been used for making adsorbent particles (e.g., see Japanese Kokai 61-174103 hereinabove), they have been found to be unsuitable for use in the invention because the unsintered particles made therefrom are grossly inadequate with respect to compressive strength when compared to particles made in accordance with the invention using metal oxide hydrogels. The strength of adsorbent particles made using xerogels has been found to be less than 25% of the strength of particles made in accordance with the invention using the corresponding hydrogels.

It is essential that the hydrogel particles for use in the method of the invention be ground to a mean diameter of no more than 1 micrometer and preferably no more than 0.8 micrometer in order to assure adequate strength and sphericity. However, it is also preferred that the particles not be ground too finely lest the gel structure be damaged. Thus it is preferred that the gel particles be no smaller than 0.01 micrometer mean diameter and preferably still no smaller than 0.1 micrometer. The hydrogel particles can be ground readily either dry or in the form of a slurry.

Suitable size reduction equipment includes high peripheral speed mills such as fine grinding hammermills, pin mills and colloid mills, media mills such as ball, pebble and rod mills and vibratory mills and roll mills. Depending on the degree of size reduction these devices can be used in series if necessary. For example, a colloid mill can be used for primary size reduction of the gel particles followed by a media mill to obtain the final particle size. Such equipment and procedures are well within the scope of conventional size reduction practices.

C. Sol/Hydrogel Mixture and Dilution

In order to make the product of the invention with appropriate properties, it is necessary that it be derived from an admixture of hydrogel and a hydrosol as described above. At least 0.5% by weight, basis solids, of the hydrosol is necessary in order to obtain the advantages of the invention; however, as much as 50% by weight hydrosol can be used in some instances. Therefore, at least 10% by weight hydrosol is preferred to attain suitable strength properties. Lower concentrations of sol are useful for making product with higher pore volume, but the product has lower strength. On the other hand, higher concentrations of sol are useful for making product with lower pore volume that has good physical strength. Sol concentrations in excess of 50% wt. are preferably avoided in order that the pores of the final product are not clogged.

The dilution of the sol/hydrogel slurry must be adjusted to a level of 0.5–20% by weight solids in preparation for drying. If the slurry is more concentrated than 20%, it becomes too viscous for efficient spray drying operation. On the other hand, if it is below 0.5% by weight, the cost of water removal becomes onerous. It is therefore preferred that the solids content of the sol/hydrogel slurry be 3–20% by weight.

The solids content of the gel is about 30% by weight and of the sol is about 15% wt. Therefore, in order to adjust the viscosity of the sol/hydrogel admixture to a level so that it can be sprayed, either the hydrogel, the sol and/or sol/hydrogel mixture must be diluted. The manner in which this is done does not appear to be critical. That is, the sol and hydrogel particles can be mixed and the mixture diluted. The sol can be diluted to a level such that when the hydrogel is added, it will be of proper viscosity. The gel can be slurried, ground and then mixed with the sol either with or without further dilution. In general it is preferred for reason of stability and controlling structure that the contact time between the gel and sol be reduced as much as possible. Therefore, it is preferred that the gel and sol each be diluted to the desired level (3–20% weight basis solids) and mixed just prior to spray drying.

The composition of the dilute aqueous sol/hydrogel slurry is defined as percent weight sol and gel particles based on the total wet weight of the slurry.

D. Slurry Drying

The diluted slurry of hydrogel and sol is then atomized and dried under conditions to produce a spherical product having a particle size distribution which is tailored to the particular end use without excessive loss during classification. The preferred drying technique is the use of a drying device in which the hydrogel/sol slurry is formed into fine droplets, which are then dried in hot gas or vapor.

The atomization of the slurry may be carried out with any known industrial means of atomization of which pressure spray nozzles, two-fluid nozzles and disk/cup rotary atomizers are exemplary. Either concurrent, mixed flow or countercurrent operation is possible. A combined spray dryer and fluidized bed dryer might also be used. Alternatively, the slurry can be dried by a "prilling tower" technique in which droplets are allowed to fall downwardly through a tower having an upward-flowing stream of heated gas or vapor. If spherical particles are not needed, the slurry can be dried by casting, by a falling film or other technique. It is, however, preferred to dry the hydrogel/sol slurry by spray drying in such manner that spherical are obtained with appropriate porosimetry.

To obtain good sphericity of the solid particles, the drying conditions are quite important. In particular, it has been found that (1) the drying gas must have high humidity in the range of 60–80% relative humidity (RH) and (2), the inlet temperature of the droplets and the outlet temperature of the dried particles must be carefully controlled. Specifically, the feed temperature of the droplets should be within a range of 150–210° F. and the outlet temperature of the dried particles should be 300–380° F. To optimize further the sphericity of the thusly dried particles it is preferred that the feed temperature of the droplets be 170–200° F. and the outlet temperature of the dried particles be 330–360° F. These drying parameters are quite important to achieve proper sphericity and pore properties and therefore should be maintained even though throughput may vary.

Post Drying Heat Treatment:

When making the unsintered adsorbents by the first of the above-described procedures, it remains important to carry out the heat treatment under humid conditions, which facilitate better control of the pore shrinkage.

It is therefore preferred that the relative humidity of the drying gas be at least 15% and preferably at least 20%. Even higher humidity drying gases or vapors can be used, for example, saturated heated steam. It has been found that when dry gas systems are employed in the invention, there is little or no shrinkage of the pores.

A drying temperature of at least 125° C. is needed to obtain an adequate drying rate, but the drying temperature should be below the sintering temperature of the gel and sol solid particles. A temperature of at least 50° C. below the sintering temperature is preferred.

To obtain adequate pore development, it is necessary that the water content of the product be reduced to 15% wt. or below. If the water content is significantly above 15%, bonding between the sol and gel particles is hindered and the particle strength is too low. Therefore, minimum water content is preferred. Nevertheless, in ordinary circumstances, the economics of the drying operation will dictate that the water content not be lower than about 0.5% wt.

In all events, the drying conditions should be adjusted to obtain a particle size of 3–150 micrometers, a range which finds the greatest scope of industrial applications.

When making adsorbents by the second of the above-described procedures, which is expressly directed to making the adsorbents having carefully preselected surface area, pore volume and pore diameters, sintering of the particles may take place, depending on the time and temperature conditions, but is not essential.

In particular, it has been found that good predictability of physical properties can be obtained in this step if the agglomerated dried particles are heated to a temperature of 350–370° C. for a time sufficient to reduce the surface area and pore volume and increase the pore diameter.

It is the goal of the invention that both the particle size distribution and the pore size distribution are narrow. In both cases, it is preferred that dv10/dv90 ratio of the particle size and of the pore size be within the range of 0.9–4, a range of 1–2 Å being especially preferred. To the extent that it is practicable, it is preferred that the particle and pore sizes are substantially mono-modal, i.e., they approach 1.

For most applications of the adsorbent of the invention, it is necessary that the average surface area of the particles be at least 150 m$^2$/g. If the surface area is below 150 m$^2$/g, the number of uses is drastically limited. On the other hand, 800 m$^2$/g is about the maximum surface area which is attainable with current technology.

While it is desired that the pore diameter of the particles made by the method of the invention be as small as possible, a lower practical limit is about 30 Å. Higher pore sizes can be used up to a maximum of about 1,000 Å; but above 1,000 Å, the particles tend to become too weak for many applications.

E. Particle Post Treatment

It is well known that upon heating wet gels in the presence of water above 100° C., loss of surface takes place by the movement of amorphous silica from wide pores to fill in small pores. This process, which is referred to as "hydrothermal treatment" is accelerated by the presence of a base. The proposed mechanisms to explain the pore change phenomena are set out in Iler, *The Chemistry of Silica*, John Wiley & Sons, N.Y., 1979, pages 539–541. However, in a further aspect of the invention, it has been found that the adsorbent products of the invention, which contain as much as 15% wt. water, undergo a transition that resembles the hydrothermal treatment of silica. In particular, it has been found that the products of the invention undergo a gradual increase in pore size with the passage of time either with or without the application of heat and without the addition of moisture or base. Thus, particles produced by the method of the invention having a given pore size and surface area can be given larger average pore size and lower surface area simply by storage at ambient conditions without the necessity of actual treatment at high temperatures with water or steam. Pore volume does not however change substantially.

This phenomenon is a function of time and temperature. That is, the rate of change is directly related to the time and temperature at which the adsorbent particles are maintained. Thus, at ambient temperature, significant changes require at least several weeks. However, at elevated temperatures the rate of change is much higher. This can be seen in FIGS. 3 and 4 of the Drawing, which show the treatability of adsorbent particles made in the manner of Example 1 (initial particle properties: surface area 380 m$^2$/g, pore diameter 107 Å, pore volume 1.0 cc/g).

Figure 3:
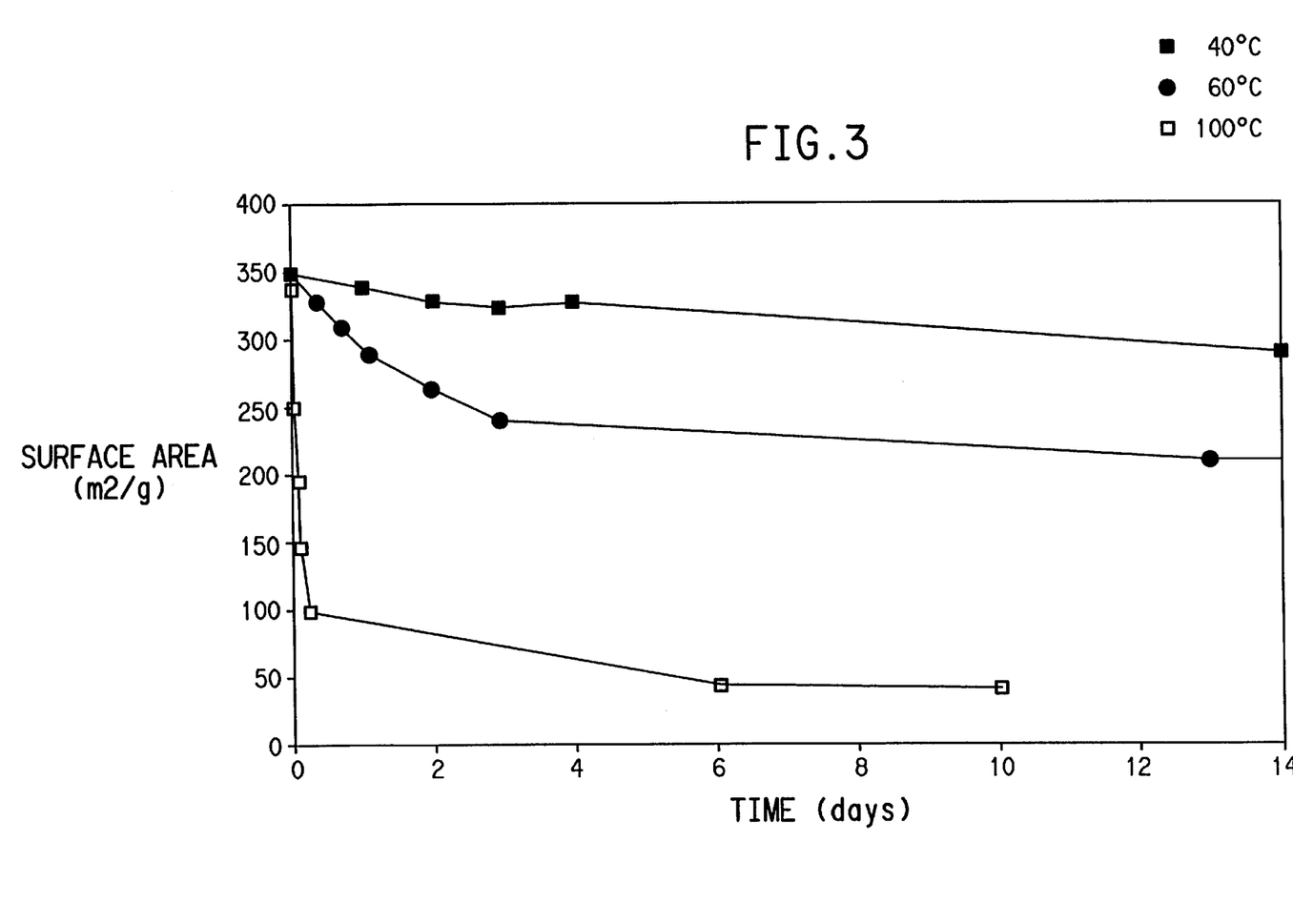
FIG. 3 is a graphical correlation showing the effect of temperature in changing the surface area of adsorbent particles during post treatment.

FIG. 3 shows the effect of temperature on the rate of surface area change. Thus, at 40° C., surface area dropped by 50 m$^2$/g only after 10 days; but at 60° C., the same drop in surface area took less than one day. Furthermore, at 100° C., the 50 m$^2$/g drop in surface area took only 2–3 hours.

Figure 4:
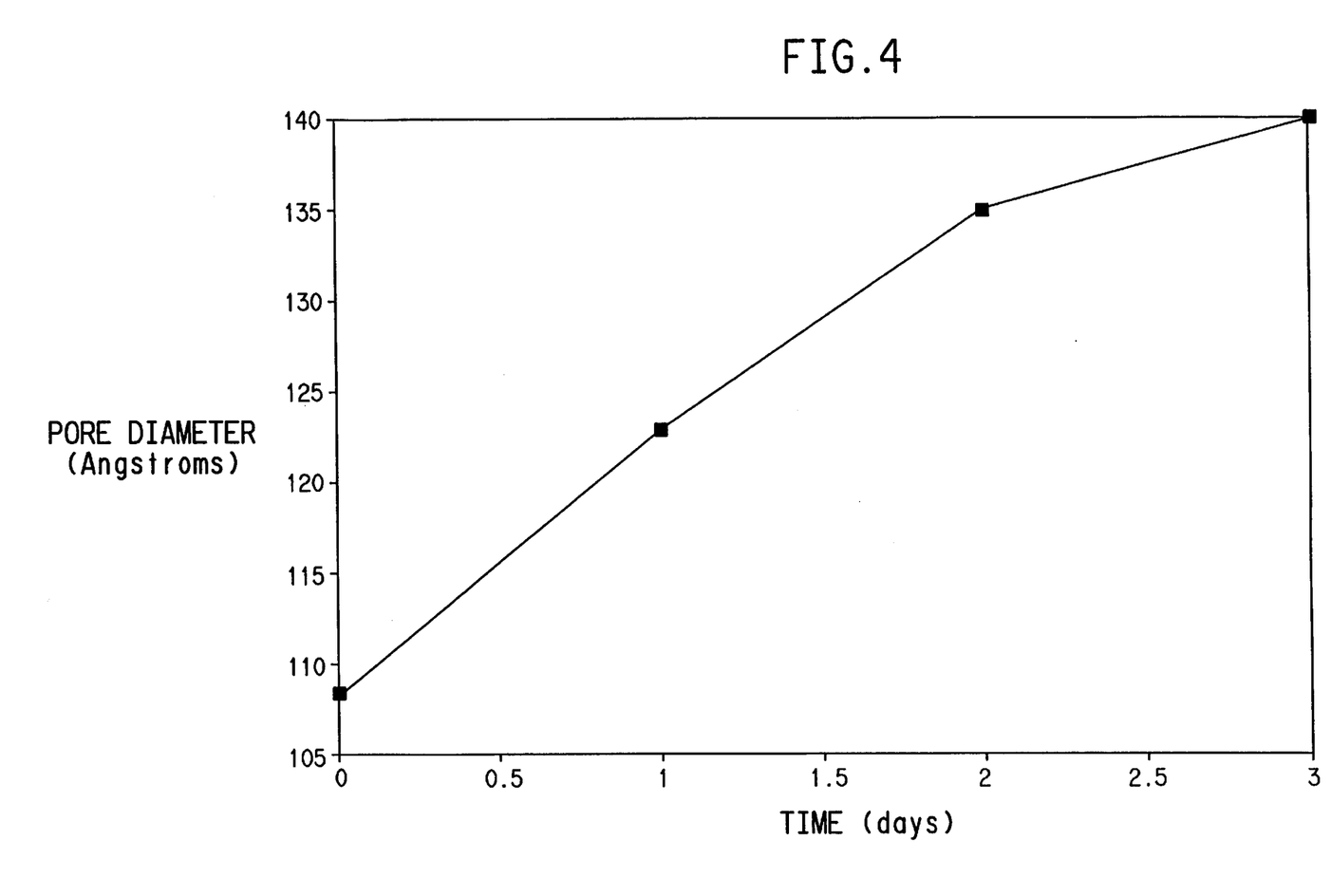
FIG. 4 is a graphical correlation showing the effect of time in changing the surface area of adsorbent particles during post treatment.

Turning now to FIG. 4, the effect of time on pore diameter is shown when the particles are maintained at 60° C. This graph shows that it took only 2 days at this temperature for the product to raise the pore diameter from 108 Å to 135 Å and one day longer to raise the pore diameter to 140 Å.

Figure 5:
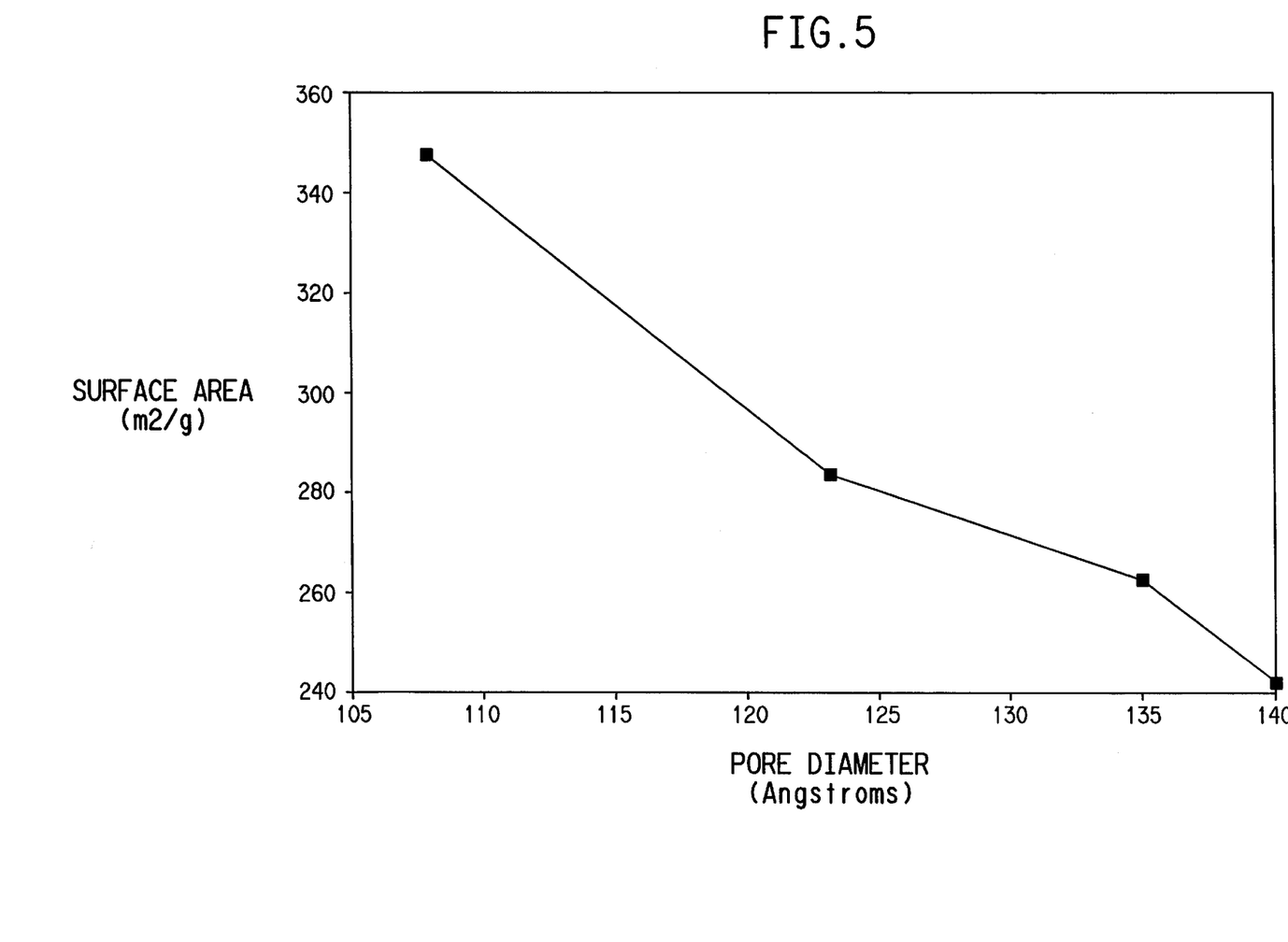
FIG. 5 is a graphical representation showing the correlation between surface area and pore diameter of adsorbent particles post treated in accordance with the invention.

FIG. 5 shows the correlation of surface area with pore diameter. Thus, as surface area dropped from about 350 to about 250 m$^2$/g pore diameter was raised from about 110 Å to 140 Å.

These data show that at zero centigrade almost no change in surface area and pore size takes place. Moreover, excessive times are required if treatment is carried out lower than 20° C. If the post treatment is carried out under pressure, even higher temperatures can be used so long as dehydration of the particles is not too great. It is therefore preferred that no more than 20% of the water in the particles be released during particle post-treatment and preferably still no more than 10% loss of water should take place. Ordinarily, it is preferred to carry out the post treatment at a temperature of at least 40° C.

It is a distinct advantage of this post treatment that the change in pore size and surface area can be arrested completely simply by treating the particles with aqueous solutions of acid to effect neutralization of the unsintered sol/hydrogel. Virtually any acid can be used for this purpose, but simple inorganic acids such as HCl or HNO$_3$ are preferred.

The amount or concentration of the acid is likewise not critical so long as substantially complete neutralization of the particles is achieved. That is, the pH of the moist acid-treated particles is below 7.

Thus, in the final product, the surface area, pore size and pore volume can be controlled by (1) judicious choice of the starting hydrogel, (2) adjusting the amounts and size of the colloidal silica, (3) choosing the proper conditions for post treatment and (4) pH adjustment of the final product.

Nonthermal Post Treatment:

Following the above-described two methods for post treatment of the adsorbent particles thermally, it is further preferred to acid treat the particles to stabilize their configuration and prevent any substantial physical changes. This is done by treating the cooled particles from the heat treatment step with an aqueous solution of inorganic acid, such as HCl, to stabilize the surface pH of the particles to a pH of about 7. In general, such stability can be obtained if the pH is 7+/−0.5.

DETAILED DESCRIPTION OF THE DRAWING

Figure 1:
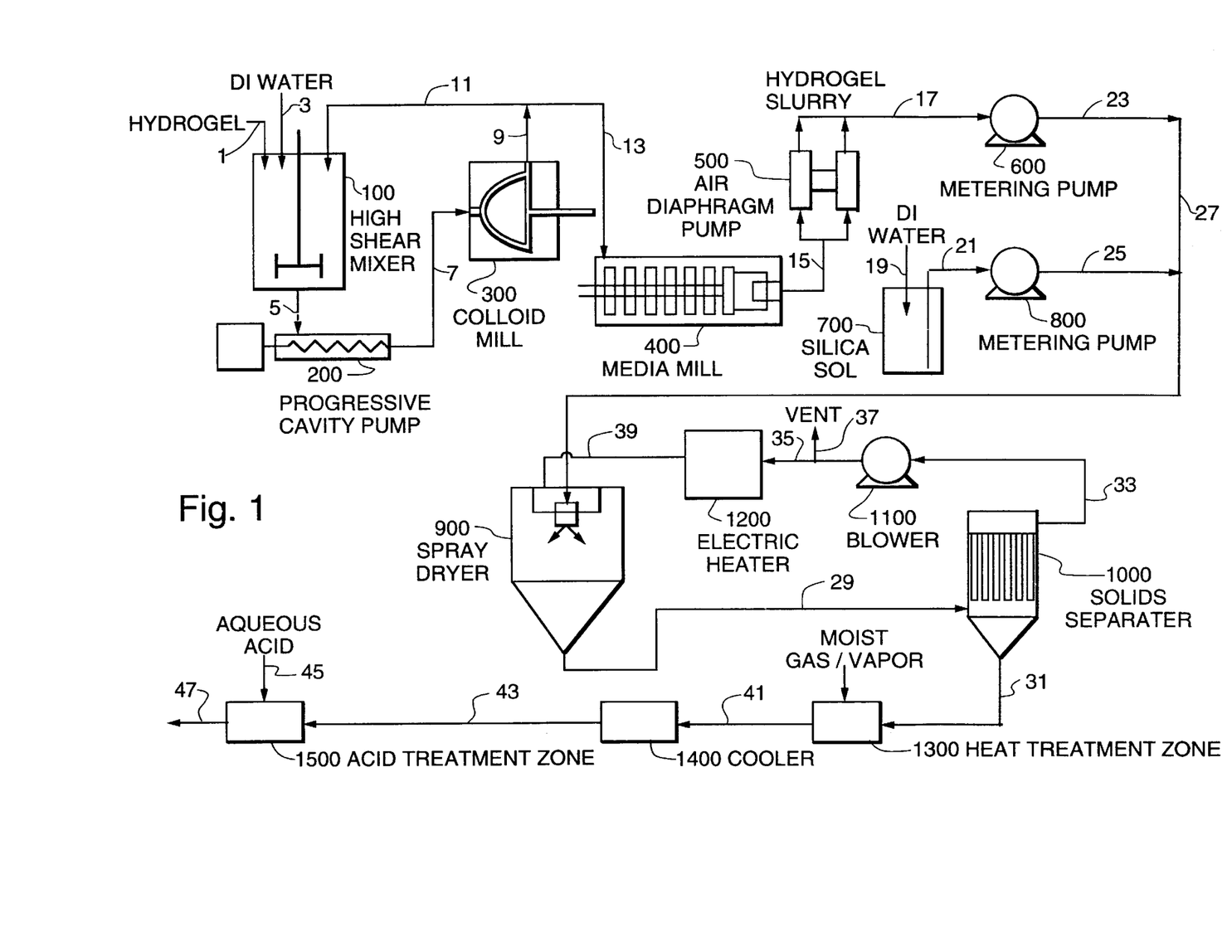
FIG. 1 depicts schematically the preferred sequence of steps for making the composition of the invention.

The invention can be readily understood by reference to FIG. 1 of the Drawing, which is a schematic flow diagram of the method of the invention.

Hydrogel is fed via line 1 and de-ionized water is fed via line 3 to high shear mixer 100 in which the water and hydrogel are subjected to high shear mixing. The thoroughly mixed slurry of hydrogel and water is then passed via line 5 to progressive cavity pump 200 from which it is pumped via line 7 to colloid mill 300 in which the particle size of the hydrogel is reduced further. A portion of the discharge from the colloid mill 300 is recycled via lines 9 and 11 to the high shear mixer 100. The remainder of the colloid mill 300 effluent is fed via lines 9 and 13 to media mill 400 in which the particle size of the hydrogel is reduced still further. The slurry discharge from media mill 400 is passed via line 15 to air diaphragm pump 500 and then through line 17 to the intake side of metering pump 600. Simultaneously, de-ionized water is fed via line 19 into silica sol reservoir 700, in which the water is admixed with and dilutes the silica sol. The diluted silica sol is then fed via line 21 to the intake side of metering pump 800.

The dilute hydrogel slurry output from metering pump 600 and the dilute silica sol slurry output from metering pump 800 are fed via lines 23 and 25 respectively and mixed in line 27 through which the admixture is fed to spray dryer 900.

In spray dryer 900, the mixture of diluted hydrogel and silica sol is atomized in humid heated air to form finely divided solid particles. The spray-dried particles are discharged from the bottom of spray dryer 900 via line 29 to solids separator 1000, which in a preferred form is a bag separator. In separator 1000, the larger particles are collected on the inside of the bags and discharged from the bottom of the separator through line 31. Fine particles and air from the spray dryer 900 pass through the separator 1000 bags and are discharged through line 33 to blower 1100.

The mixture of solid fines and air from separator 1000 is passed to electric heater 1200 in which the air is reheated. A portion of the air-borne fines from blower 1100 are vented from the system through line 37. The heated mixture of fines and air from electric heater 1200 are then recycled to spray dryer 900 through line 39.

The separated larger particles are passed from separator 1000 via line 31 to heat treatment zone 1300 in which they are treated with a moist gas or vapor at a temperature of at least 125° C., but below the sintering temperature of the oxides contained therein, to form particles having an average particle size of 3–150 micrometers. The thusly formed particles are passed from the heat treatment zone 1300 via line 41 to cooler 1400 in which the temperature of the particles is lowered, after which the particles are passed via line 43 to acid treatment zone 1500 in which the particles are treated with an aqueous solution of inorganic acid from line 45. The acid-treated particles are then removed via line 47 ready for use.

Test Procedures:

In the examples which follow, product properties were determined by the following procedures:

Particle size of spray dried product was measured using a Model 0646 Coulter Counter (Coulter Corporation, Hialeah, Fla.);

Hydrogel particle size was observed by SEM photomicroscopy.

Particle strength was measured by the following procedure: A fixed bed of the adsorbent particles is formed by filling a 4.6 mm ID stainless steel column with a degassed slurry of 4 grams of the particles dispersed in organic solvent. A liquid carrier is then pumped through the particle bed at a pressure of 10,000 psi until the effluent flow becomes constant. For comparison, a similar column is prepared using standard adsorbent particles, the properties of which are known.

After the column is packed, it is connected to an HPLC system, a liquid mobile phase is passed through the column at a fixed rate of flow and the pressure drop is recorded. The pressure drop over the columns containing the test material and the standard material are then compared. Observation of a higher pressure drop through the column containing the test material indicates a higher degree of fragmentation of the test material. Alternatively, fragmentation can be observed by measuring the pressure drop in the column containing the test material and comparing it with a pressure drop predicted in accordance with Darcy's law.

Mean particle diameter was determined by calculation from the particle size data;

Surface area was measured by nitrogen porosimetry;

Pore volume was measured by nitrogen porosimetry; and

Water and solids contents were measured by weight loss on drying.

EXAMPLES

In the following examples, the spherical microspheres tested were made by the following procedure:

Hydrogel Slurry Preparation:

Ten micron microspheres required the preparation of 3% solids hydrogel slurry and forty micron particle size product required preparation of 15% solids slurry. Forty pounds of 30% solids hydrogel were dispersed in 360 pounds of deionized water to produce 3% solids slurry and 250 pounds of hydrogel were dispersed in 250 pounds of deionized water to produce 15% solids slurry. Solids content of the hydrogel was approximately 30% solids.

1. The processing units and lines were thoroughly rinsed and flushed with deionized water.
2. The appropriate quantity of deionized water was added to a high shear mixer. The high shear mixer was a Cowles Dissolver Model W24X made by Cowles Tool Co., Cleveland, Ohio. The dissolver utilized a blade having a diameter of 9 inches located 8 inches from the bottom of a 2 ft. ×3 ft. mixing chamber.
3. The high shear mixer was turned on and the rotor speed turned up to 1800 rpm.
4. With the rotor and stator gap open, the colloid mill was turned on.
5. Valving of the system was set to permit only recycle to the high shear mixer from the colloid mill and the progressive cavity pump was turned on to establish recycle through the colloid mill.
6. Hydrogel was then added to the high shear mixer.
7. The gap of the colloid mill was closed to the minimum tolerance and the system was permitted to recycle through the colloid mill for one hour prior to starting flow through media mill. The colloid mill is model #8-DM Colloid Mill made by Bematex Systems, Inc., Beverly, Mass.
8. The progressive cavity flow rate was maintained at approximately 8 liters per minute with the flow through the media mill being approximately 0.5L/min when producing 40 micron product and approximately one 1L/min when producing 10 micron product. The remainder of the progressive cavity pump was permitted to recycle to the high shear mixer vessel.
9. The media mill rotor speed was adjusted to achieve 9.5 to 10 amps load on the media mill motor (10 amps is the recommended maximum for the 4 liter mill) and cooling water flow was adjusted to keep the slurry outlet temperature below 80°C. The media used was Zirshot® Z-300, a zirconia-containing solid having a Moh hardness of 7. (Zirshot® is a tradename for grinding media supplied by S. E. Firestone Associates, Inc., Philadelphia, Pa.)
10. The throughput of the media mill was boosted with a double diaphragm, air driven pump to obtain positive pressure delivery of the slurry to the spray dryer feed preparation section.

Spray Dryer Feed Preparation:

Feed preparation was carried out by metering the hydrogel and the sol at a weight ratio of three parts hydrogel to one part silica sol (Nyacol® 215 sol) through a mixing "T" for delivery to the Spray Drying System. (Nyacol® is a tradename for silica sols made by The PQ Corporation, Valley Forge, Pa.)

The hydrogel and silica sol were prepared at 3% solids to produce nominally ten micron product with typical flow rates of 2.8 to 3.0lb/min hydrosol slurry and 0.7 to 0.75 lb/min of prediluted silica sol. The metering pumps used were only capable of 1000 psi pressure and a booster pump was required to deliver the 3000 psi pressure to the atomizing nozzle in the spray dryer.

Production of nominally forty micron product required 15% hydrogel slurry and the standard Nyacol® 215 silica sol which is 15% solids as delivered. Typical flow rates of the silica hydrogel slurry were 1.1 to 1.2 lb/min and of silica sol were 0.275 to 0.3 lb/min. The 1000 pound pressure capability of the metering pumps did not require the use of a booster pump for forty micron product for delivery of the required 600 psi to the atomizing nozzle of the spray dryer.

Spray Dryer Operation:

Spray drying was carried out on a spray tower having a 60 degree bottom cone. A pressure nozzle was used to atomize the dilute mixture of gel and sol.

The spray drying system was configured with the drying gasses being recycled to an electric heater with the net leaking and water vapor from drying being permitted to vent. The temperature of the recycle stream of the drying gasses, while drying nominally 40 micrometers product was found to be 186° F. at 23% relative humidity with a flow rate of approximately 1200 acfm. This drying configuration was used for both nominally ten and forty micrometers products.

Ten micrometers product required a booster pump to reach the 3000 psi to the drying atomizing nozzle. Typical process conditions were as follows:

- Inlet Temp. 260 F.
- Outlet Temp. 380 F.
- Spray Nozzle Spraying Systems Spray Drying Nozzle #R72–216
- Slurry Feed Rate 3.5 to 3.75 lb/min at 3000 psi Product collection was from the bottom outlet from a bag dust collector.

EXAMPLES 1–7

Figure 2:
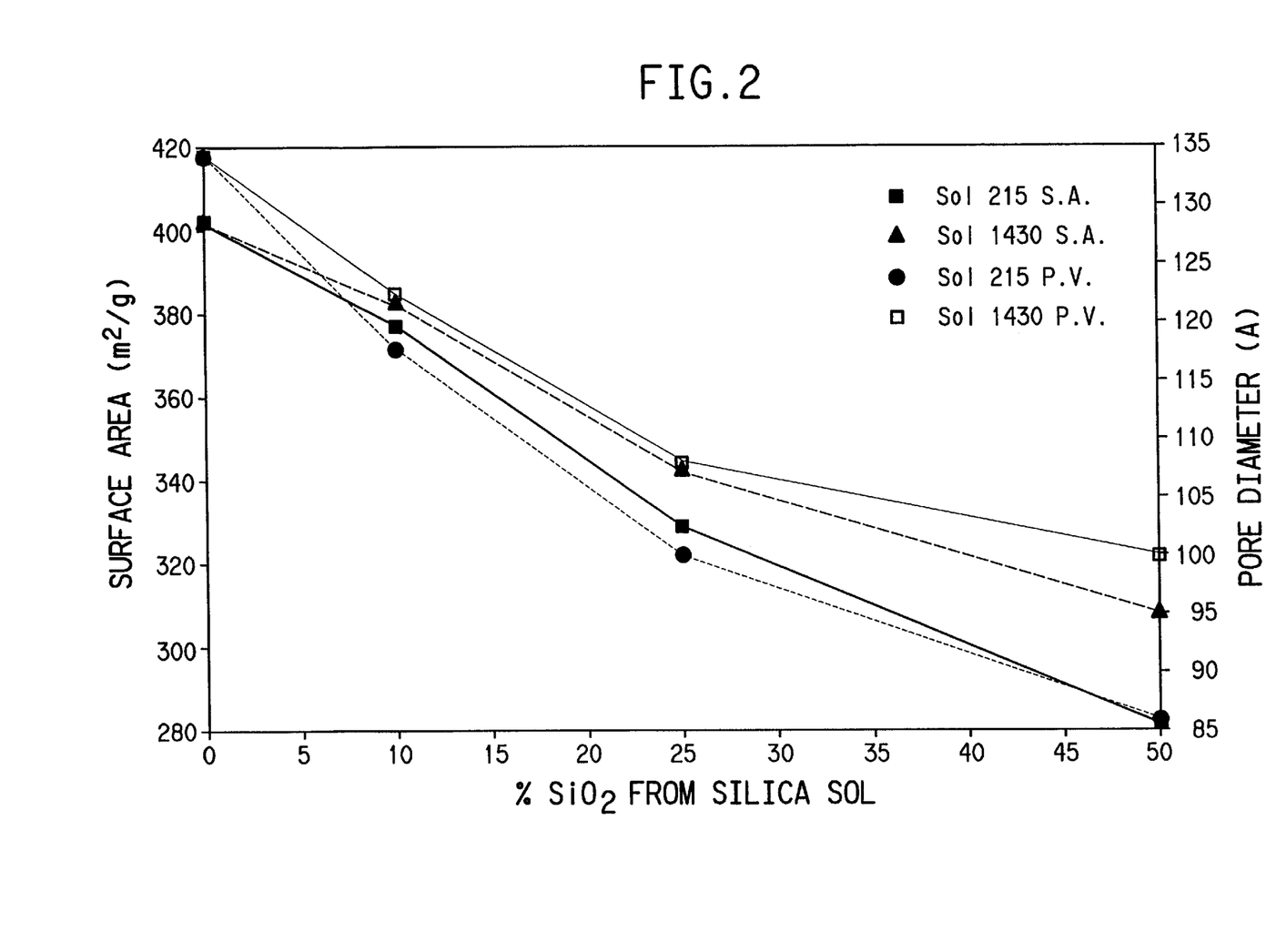
FIG. 2 is a graphical correlation showing the effect of the hydrosol/hydrogel ratio on particle surface area and pore diameter using a hydrogel having a starting pore size of 100 Å.

Using the above-described procedure, two series of unsintered microspherical particles were made, each series containing particles comprising 10, 25 and 50% by weight silica derived from silica hydrosol. Two different hydrosols were used for these series. In one (Sol 215), the sol contained 2 nm silica particles at a concentration of 15% by weight. In the other (Sol 1430), the sol contained 14 nm silica particles at a concentration of 30% by weight. In addition, a control sample was made in which only hydrogel and no hydrosol was used. The surface area and pore diameter of each of these 7 products were measured by the above-described procedures. The data from these tests are shown in FIG. 2. (Sols 215 and 1430 are trade designations for silica sols made by Nyacol Products, Inc., Ashland, Mass.)

The data in FIG. 2 show clearly that as the amount of hydrosol admixed with the hydrogel is increased, the surface area is decreased substantially. In the tests using the sol containing 15% solids, particle surface area dropped from about 400 m²/g with no hydrosol to about 280 m²/g at 50% by weight silica derived from hydrosol. Similarly, in the tests using the sol containing 30% solids, particle surface area dropped from about 420 m²/g with no hydrosol to about 305 m²/g at 50% silica from hydrosol.

The data in FIG. 2 also clearly show that as the amount of hydrosol admixed with the hydrogel is increased, the pore diameter is also decreased substantially. In the tests using the sol containing 15% solids, pore diameter dropped from about 135 Å with no hydrosol to about 85 Å with 50% weight silica from hydrosol. Similarly, in the tests using the sol containing 30% solids, pore diameter dropped from about 135 Å with no hydrosol to about 95 Å with 50% weight silica from hydrosol. Thus, these data show that surface area and pore diameter can be controlled by varying the amount of silica derived from hydrosol.

EXAMPLES 8–11

Using the same procedure as Examples 1–7, a series of four unsintered microspherical particles was prepared from the following compositions:

TABLE 1

| Example No. | Total Solids (% wt.) | Added Silica Sol (% wt.) |
|---|---|---|
| 8 | 3.5 | 10.0 |
| 9 | 3.5 | None |
| 10 | 8.7 | 10.0 |
| 11 | 8.7 | None |

Each of these compositions was examined by gas adsorption/desorption techniques (Autosorb automated gas adsorption, Quantochrome Corp.). In this test, the relative change in pore size is measured by the change in gas desorption. The distribution curve obtained during the desorption cycle (change in pore volume as a function of radius) shows clearly differences in the distribution of pore sizes among the four compositions. These data, which are set out in Table 2 below, show that there was little change in the distribution of pores of 30 Å or less. On the other hand, the distribution of pores in the 80 Å and higher range was lower. However, the number of pores within the 30–80 Å range increased markedly. These data show clearly the very desirable versatility of the method of the invention to make adsorbent particles having a specified narrow range of pore sizes.

TABLE 2

Correlation of Pore Radius with Changes in Gas Desorption Volume

| Example No. Radius, Å | 8 | 9 | 10 | 11 |
|---|---|---|---|---|
| | Gas Desorption Volume (Δcm³/Å.g) | | | |
| 14 | 0.00 | 0.00 | 0.00 | 0.00 |
| 20 | 0.21 | 0.22 | 0.19 | 0.17 |
| 30 | 0.60 | 0.69 | 0.55 | 0.57 |
| 40 | 1.41 | 1.34 | 1.07 | 0.96 |
| 50 | 2.60 | 1.97 | 2.01 | 1.90 |
| 60 | 3.52 | 2.02 | 2.98 | 1.98 |
| 65 | — | — | 3.24 | 2.64 |
| 70 | 2.11 | 1.87 | 2.92 | 1.97 |
| 80 | 0.39 | 1.11 | 0.97 | 2.05 |
| 90 | 0.11 | 0.87 | 0.10 | 0.93 |
| 100 | 0.04 | 0.40 | 0.05 | 0.36 |
| 200 | 0.00 | 0.03 | 0.00 | 0.03 |

We claim:

1. A method for making unsintered agglomerated adsorbent particles having high mechanical strength and controlled pore size distribution comprising the steps:

(1) forming a dilute aqueous admixture of (a) 50–99.5% wt. particles of silica hydrogel, the particles having a mean diameter of 0.01–1 micrometer and (b) 50–0.5% wt. stabilized sol selected from silica sol, sol of a metal oxide in which the metal is selected from Al, Fe, Mg, Sb, Sn, Ti, Zn, Zr and mixtures of such sols in which the silica and metal oxide content is 1–30% wt., and the average particle size of the sol particles is 2–100 nm the total concentration of solids contained in the dilute admixture being 0.5–20% wt.; and (2) forming droplets from the dilute sol/hydrogel admixture and reducing the water content of the droplets to form therefrom agglomerated solid particles of spherical configuration by passing the droplets through a humid gas drying chamber in which the inlet temperature of the sol/hydrogel droplets is 65–100° C. (150–210° F.) and the outlet temperature of the resulting solid particle is 150–200° C. (300–400° F.); and (3) heat treating the solid particles from step (2) by contacting them with a gas or vapor having a water content of at least 20% wt. and temperature of at least 125° C., but below the sintering temperature of the oxides therein to form particles having an average size of 3–150 micrometers (4) cooling the treated particles from step (3); and (5) treating the cooled particles from step (4) with an aqueous solution of inorganic acid to stabilize the surface of the particles to a pH of about 7.

2. The method of claim 1 in which the sol is sodium stabilized.

3. The method of claim 1 in which larger hydrogel particles are slurried and the slurried particles are milled to size prior to admixture with the silica or metal oxide sol.

4. The method of claim 1 in which larger hydrogel particles are milled to size, admixed with the silica or metal oxide sol and the admixture is milled.

5. The method of claim 1 in which the hydrogel is an acid-set silica gel.

6. The method of claim 1 in which the hydrogel is an alkaline-set silica gel.

7. The method of claim 1 in which the water content of the diluted admixture is reduced by spray drying.

8. An unsintered spherical adsorbent particle composition having an average diameter of 3–150 micrometers comprising 50–99.5% wt. finely milled particles of silica hydrogel having a mean diameter of 0.01–1 micrometer bonded together with 50–0.5% wt. of a stabilized sol selected from silica sol, sol of an oxide of a metal selected from Al, Fe, Mg, Sb, Sn, Ti, Zn, and Zr and mixtures of such stabilized sols in which the silica and metal oxide content is 1–30% wt., the average size of the sol particles being 2–1000 nm, the pores of the adsorbent particles being partially filled with sol particles so that none of the pores has a diameter below 10 Å, the adsorbent particles being further characterized in that the dv10/dv90 ratio is 0.9–4, surface area is 150–600 $m^2/g$, pore volume is 0.3–2 cc/g, mean pore diameter is 30–1000 Å and the water content is 0.5–15% wt.

9. The adsorbent particle composition of claim 8 in which the average size of the sol particles therein is 2–25 nm.

10. The adsorbent particle composition of claim 8 in which the silica sol or metal sol has been sodium stabilized.

* * * * *